United States Patent
Iltchev et al.

(10) Patent No.: US 7,351,499 B2
(45) Date of Patent: Apr. 1, 2008

(54) CATHODE MATERIAL FOR BATTERY

(75) Inventors: Nikolay K. Iltchev, Norfolk, MA (US); Ou Mao, Walpole, MA (US); Cahit Eylem, Bellingham, MA (US); George Cintra, Holliston, MA (US); Leslie J. Pinnell, Framingham, MA (US)

(73) Assignee: The Gillette Company, Boston, MA (US)

( * ) Notice: Subject to any disclaimer, the term of this patent is extended or adjusted under 35 U.S.C. 154(b) by 704 days.

(21) Appl. No.: 10/765,569

(22) Filed: Jan. 28, 2004

(65) Prior Publication Data
US 2005/0164089 A1    Jul. 28, 2005

(51) Int. Cl.
*H01M 4/50*    (2006.01)

(52) U.S. Cl. ............... 429/224; 429/229; 429/232; 429/206

(58) Field of Classification Search ........... 429/224, 429/232, 206, 229
See application file for complete search history.

(56) References Cited

U.S. PATENT DOCUMENTS

| | | | |
|---|---|---|---|
| 5,156,934 A | 10/1992 | Kainthla et al. | |
| 5,599,644 A | 2/1997 | Swierbut et al. | |
| 5,698,315 A | 12/1997 | Hayashi et al. | |
| 5,919,518 A | 7/1999 | Hayashi et al. | |
| 5,997,775 A | 12/1999 | Hayashi et al. | |
| 6,203,943 B1 | 3/2001 | Bennett et al. | |
| 6,337,160 B1 | 1/2002 | Hilarius et al. | |
| 6,348,259 B1 | 2/2002 | Hilarius et al. | |
| 7,008,723 B2 * | 3/2006 | Daniel-Ivad et al. | ........ 429/206 |

FOREIGN PATENT DOCUMENTS

| | | |
|---|---|---|
| DE | 196 07 512 A1 | 11/1997 |
| JP | 05-2225978 | 9/1993 |
| WO | WO93/12551 | 6/1993 |
| WO | WO 00/30198 | 5/2000 |

\* cited by examiner

*Primary Examiner*—Laura Weiner
(74) *Attorney, Agent, or Firm*—Fish & Richardson P.C.

(57) ABSTRACT

The cathode of an alkaline battery can include an electrically conductive additive to increase the cathode efficiency. The additive can include a barium salt and an electrically conductive material. The electrically conductive material can be coated on a surface of the barium salt. The electrically conductive material can be an electrically conductive metal oxide.

8 Claims, 5 Drawing Sheets

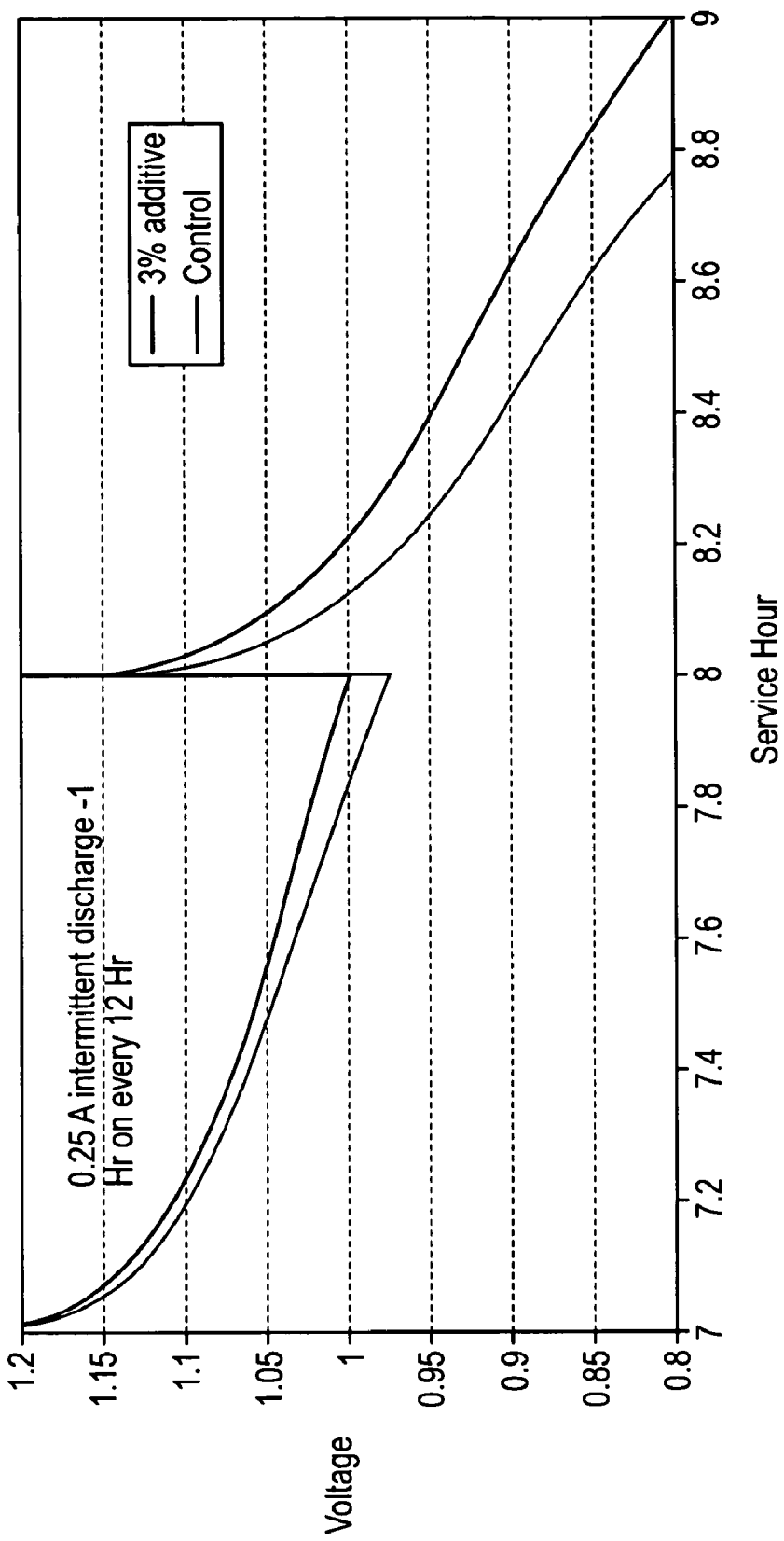

CATHODE MATERIAL FOR BATTERY

TECHNICAL FIELD

This invention relates to batteries, and more particularly to cathode materials for batteries.

BACKGROUND

Batteries are commonly used as electrical energy sources. A battery contains a negative electrode, typically called the anode, and a positive electrode, typically called the cathode. The anode contains an active material that can be oxidized. The cathode contains or consumes an active material that can be reduced. The anode active material is capable of reducing the cathode active material.

When a battery is used as an electrical energy source in a device, electrical contact is made to the anode and the cathode, allowing electrons to flow through the device and permitting the respective oxidation and reduction reactions to occur to provide electrical power. An electrolyte in contact with the anode and the cathode contains ions that flow through the separator between the electrodes to maintain charge balance throughout the battery during discharge.

SUMMARY

An alkaline battery can include a cathode, an anode, and an aqueous alkaline electrolyte. The cathode can include a cathode active material and a conductive additive. Alkaline batteries having increased service life are desirable. The cathode active material can include manganese dioxide.

In one aspect, an alkaline battery includes a cathode comprising an additive, the additive including a barium salt and an electrically conductive material, and a manganese dioxide, an anode comprising zinc, a separator between the cathode and the anode, and an alkaline electrolyte in contact with the cathode and the anode.

In another aspect, an alkaline battery includes a cathode comprising an additive, the additive including a barium salt and a coating on a surface of the barium salt, and a manganese dioxide, an anode comprising zinc, a separator between the cathode and the anode, and an alkaline electrolyte in contact with the cathode and the anode.

In another aspect, a method of manufacturing an alkaline battery includes forming a cathode including a cathode active material including a manganese dioxide, and an additive including a barium salt and an electrically conductive material.

In another aspect, a method of making an alkaline battery includes combining an additive, the additive including a barium salt and a coating on a surface of the barium salt, with a cathode active material including a manganese dioxide.

In yet another aspect, a method of increasing the service life of an alkaline battery includes adding an additive, the additive including a barium salt and a coating on a surface of the barium salt, to a cathode active material including a manganese dioxide.

The electrically conductive material can be coated on a surface of the barium salt. The electrically conductive material can include a metal oxide. The coating can be electrically conductive. The coating can include a metal oxide. The metal oxide can be a tin oxide. The barium salt can include barium sulfate, barium hydroxide, barium carbonate, or barium oxide. The manganese dioxide can be an electrolytic manganese dioxide. The service life of the battery in an intermittent discharge test can be at least 2%, or at least 3% longer than the service life of a battery lacking the particle. The method can include assembling the cathode with an anode, a separator, and an electrolyte in a housing.

Battery service life is the amount of time that a battery can provide electrical power at or above a specified voltage under a set of operating conditions. One limitation on service life can arise from the efficiency with which the cathode active material is consumed. If the entire capacity of the cathode active material is not used, then the battery life can be diminished. A conductive additive can increase the efficiency of the cathode active material.

The details of one or more embodiments are set forth in the accompanying drawings and the description below. Other features, objects, and advantages will be apparent from the description and drawings, and from the claims.

DESCRIPTION OF DRAWINGS

FIG. 5 is a graph depicting battery performance.

DETAILED DESCRIPTION

Figure 1:
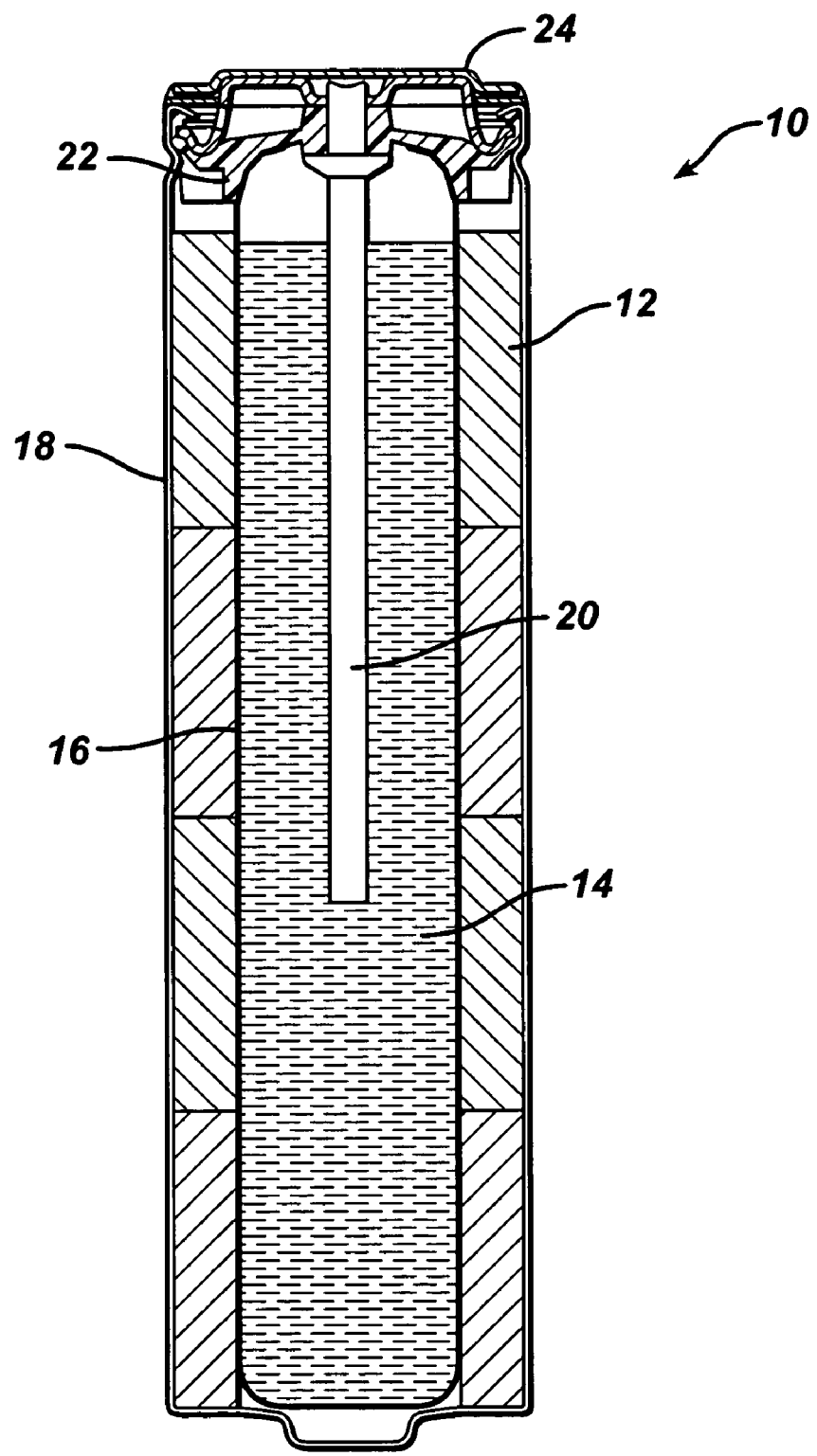
FIG. 1 is a schematic diagram of a battery.

Referring to FIG. 1, battery 10 includes a cathode 12, an anode 14, a separator 16 and a cylindrical housing 18. Battery 10 also includes current collector 20, seal 22, and a negative metal top cap 24, which serves as the negative terminal for the battery. The cathode is in contact with the housing, and the positive terminal of the battery is at the opposite end of the battery from the negative terminal. An electrolytic solution is dispersed throughout battery 10. Battery 10 can be, for example, a AA, AAA, AAAA, C, or D battery. Alternatively, battery 10 can be a prismatic, laminar or thin battery or a coin or button cell.

Cathode 12 includes a manganese dioxide, carbon particles, an additive, and, optionally, a binder. Cathodes including the additive can provide enhanced performance in a battery compared to a cathode lacking the additive. In particular, a battery having a cathode including the additive can have a longer service life than a battery having a cathode lacking the additive. The additive can include a barium salt and a conductive material. The conductive material can optionally be coated on the barium salt. The barium salt can be, for example, barium sulfate, barium hydroxide, barium carbonate, or barium oxide. The conductive material can include a metal or conductive metal oxide. Suitable conductive materials can include silver, a tin oxide, a silver oxide, a silver nickel oxide, or a silver bismuth oxide. The metal oxide can be a slightly reduced or chemically doped metal oxide. A conductive tin oxide can be suitable. For example, a conductive tin oxide can be an oxygen deficient tin oxide, $SnO_{2-x}$, where x is between 1 and 2, a doped tin oxide, or a tin oxide compound. The doped tin oxide can be doped with, for example, niobium, indium, or a halide. A tin oxide compound, can include, for example, indium tin oxide.

Examples of suitable additives are described in, for example, U.S. Pat. Nos. 5,698,315, 5,919,598, and 5,997,775, each of which is incorporated by reference in its entirety. The additive can have a core material (i.e., a barium salt) with a specific surface area ranging from 0.1 to 150 $m^2/g$. The core material can be coated with a conductive coating (such as a conductive tin oxide), where the coating has a thickness ranging from 2 to 80 nm.

Any of the conventional forms of manganese dioxide used for cathodes can be used. For example, the manganese dioxide can be electrolytic manganese dioxide (EMD) or chemical manganese dioxide (CMD). Distributors of manganese dioxides include Kerr McGee Co. (Trona D), Chem Metals Co., Tosoh, Delta Manganese, Mitsui Chemicals, JMC, and Xiangtan. Generally the cathode may include, for example, between 80 wt % and 90 wt %, and preferably between 86 wt % and 88 wt %, of manganese dioxide.

Processes for the manufacture of EMD and representative properties thereof are described in "Batteries", edited by Karl V. Kordesch, Marcel Dekker, Inc., New York, Vol. 1, 1974, pp. 433-488, which is incorporated by reference in its entirety. EMD is the preferred type of manganese dioxide for use in alkaline cells. One consequence of the electrodeposition process is that the EMD typically retains a high level of surface acidity from the sulfuric acid of the electrolysis bath. This acidity in residual surface can be neutralized for example, by treatment with an aqueous base solution. Suitable aqueous bases include: sodium hydroxide, ammonium hydroxide (i.e., aqueous ammonia), calcium hydroxide, magnesium hydroxide, potassium hydroxide, lithium hydroxide, or a combination thereof.

Manganese dioxide materials can be evaluated by powder X-ray diffraction. Manganese content can be determined by inductively coupled plasma atomic emission spectroscopy. Oxygen stoichiometry (i.e., x in $MnO_x$) can be determined by titrimetry. Specific surface area can be determined from nitrogen adsorption/desorption isotherms by the BET method.

Examples of binders can include polyethylene, polyacrylic acid, or a fluorocarbon resin, such as PVDF or PTFE. An example of a polyethylene binder is sold under the trade name COATHYLENE HA-1681 (available from Hoechst or DuPont). The cathode can include, for example, between 0.1 wt % and 4 wt %, or between 0.5 wt % and 2 wt % binder.

The carbon particles can include graphite particles. The graphite can be synthetic graphite including an expanded graphite, non-synthetic graphite, natural graphite, or a blend thereof. Suitable natural graphite particles can be obtained from, for example, Brazilian Nacional de Grafite (Itapecerica, MG Brazil, NdG MP-0702x grade) or Superior Graphite Co. (Chicago, Ill., ABG-grade). Suitable expanded graphite particles can be obtained, for example, from Chuetsu Graphite Works, Ltd. (Chuetsu grades WH-20A and WH-20AF) of Japan or Timcal America (Westlake, Ohio, KS-Grade). The cathode can include, for example, between 2 wt % and 10 wt %, between 3 wt % and 8 wt %, or between 4 wt % and 6 wt % of conductive carbon particles.

An electrolyte solution can be dispersed through cathode 12, and the weight percentages provided above and below are determined after addition of the electrolyte solution. The electrolyte can be an aqueous solution of alkali hydroxide, such as potassium hydroxide or sodium hydroxide. The electrolyte can contain between 15 wt % and 60 wt %, between 20 wt % and 55 wt %, or between 30 wt % and 50 wt % of alkali hydroxide dissolved in water. The electrolyte can contain 0 wt % to 4 wt % of alkali oxide, such as zinc oxide.

Anode 14 can be formed of any of the standard zinc materials used in battery anodes. For example, anode 14 can be a zinc slurry that includes zinc metal particles, a gelling agent, and minor amounts of additives, such as gassing inhibitor. In addition, a portion of the electrolyte solution is dispersed throughout the anode.

The zinc particles can be any of the zinc particles conventionally used in slurry anodes. Examples of zinc particles include those described in U.S. Pat. Nos. 6,284,410 and 6,521,378, and U.S. application Ser. No. 09/115,867, each of which is hereby incorporated by reference in its entirety. The anode can include, for example, between 60 wt % and 80 wt %, between 65 wt % and 75 wt %, or between 67 wt % and 71 wt % of zinc particles.

Examples of a gelling agent can include a polyacrylic acid, a grafted starch material, a salt of a polyacrylic acid, a carboxymethylcellulose, a salt of a carboxymethylcellulose (e.g., sodium carboxymethylcellulose) or combinations thereof. Examples of a polyacrylic acid includes CARBOPOL 940 and 934 (available from B.F. Goodrich) and POLYGEL 4P (available from 3V), and an example of a grafted starch material includes WATERLOCK A221 or A220 (available from Grain Processing Corporation, Muscatine, Iowa). An example of a salt of a polyacrylic acid includes ALCOSORB G1 (available from Ciba Specialties). The anode can include, for example, between, between 0.05 wt % and 2 wt %, or between 0.1 wt % and 1 wt % of gelling agent.

A gassing inhibitor can include an inorganic material, such as bismuth, tin, or indium. Alternatively, a gassing inhibitor can include an organic compound, such as a phosphate ester, an ionic surfactant or a nonionic surfactant. Examples of ionic surfactants are disclosed in, for example, U.S. Pat. No. 4,777,100, which is hereby incorporated by reference in its entirety.

Separator 16 can be a conventional alkaline battery separator. In some embodiments, separator 16 can be formed of two layers of non-woven, non-membrane material with one layer being disposed along a surface of the other. For example, to minimize the volume of separator 16 while providing an efficient battery, each layer of non-woven, non-membrane material can have a basic weight of about 54 grams per square meter, a thickness of about 5.4 mils when dry and a thickness of about 10 mils when wet. The layers can be substantially devoid of fillers, such as inorganic particles.

In other embodiments, separator 16 can include a layer of cellophane combined with a layer of non-woven material. The separator also can include an additional layer of non-woven material. The cellophane layer can be adjacent cathode 12 or the anode. The non-woven material can contain from 78 wt % to 82 wt % polyvinyl alcohol and from 18 wt % to 22 wt % rayon with a trace amount of a surfactant, such as non-woven material available from PDM under the tradename PA25.

Housing 18 can be a conventional housing commonly used in primary alkaline batteries, for example, nickel plated cold-rolled steel. The housing can include an inner metal wall and an outer electrically non-conductive material such as a heat shrinkable plastic. Optionally, a layer of conductive material can be disposed between the inner wall and cathode 12. The layer can be disposed along the inner surface of the inner wall, along the circumference of cathode 12, or both. The conductive layer can be formed, for example, of a carbonaceous material (e.g., colloidal graphite), such as LB1000 (Timcal), Eccocoat 257 (W.R. Grace & Co.), Electrodag 109 (Acheson Colloids Company), Electrodag EB-009 (Acheson), Electrodag 112 (Acheson) and EB0005 (Acheson). Methods of applying the conductive layer are disclosed in, for example, Canadian Patent No. 1,263,697, which is hereby incorporated by reference in its entirety. Optionally, a corrosion-resistant coating such as gold, titanium nitride or titanium oxynitride can be applied to the inner metal wall of the housing.

Current collector 28 can be made from a suitable metal, such as brass. Seal 30 can be made, for example, of a nylon.

EXAMPLES

Out of cell electrochemical characterization was performed with a three electrode flooded cell filled with 9 N potassium hydroxide electrolyte. Hg/HgO and platinum were used as the reference and counter electrodes, respectively. The working electrode was prepared by pressing a 1:1 mixture of teflonized acetylene black:cathode active material including EMD and an additive on a 7100 nickel current collector (Delker Corporation) at a pressure of 1 metric ton/cm$^2$. The working electrode was filled with an electrolyte under vacuum in order to enhance wetting. Electrochemical measurements were conducted with a 273A EG&G Princeton Applied Research potentiostat driven by CorrWare electrochemical data acquisition software.

Figure 2:
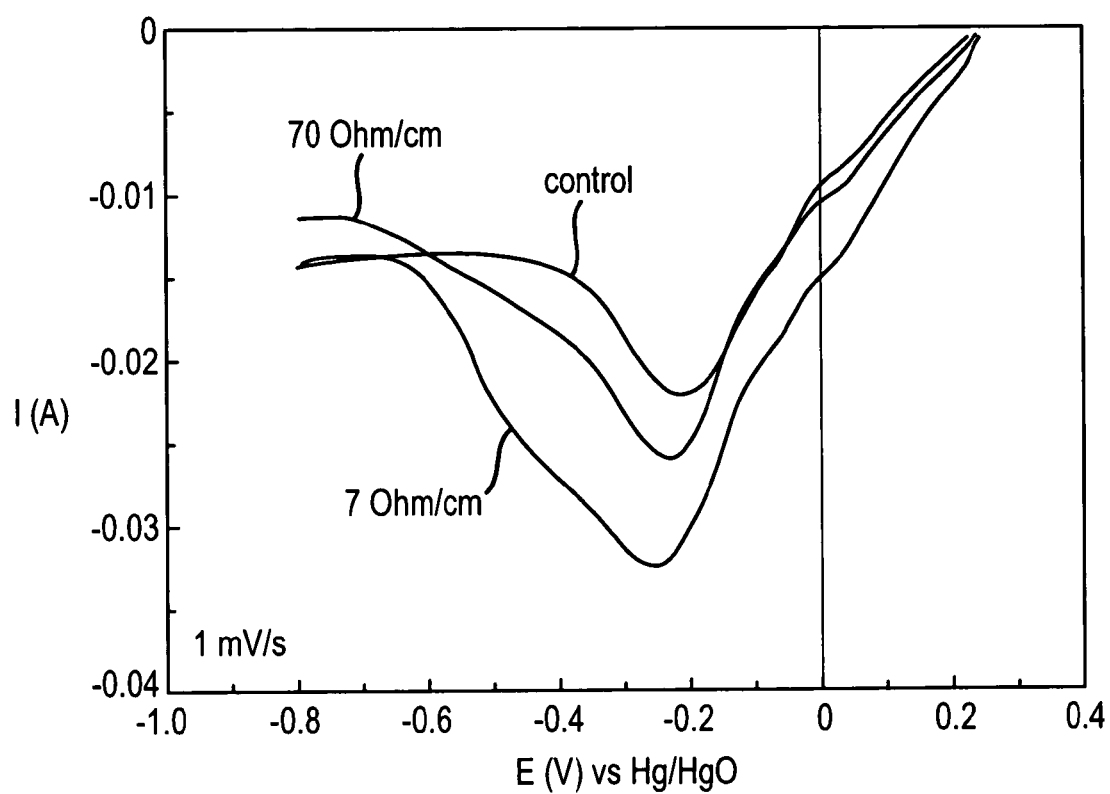
FIG. 2 is a graph depicting electrochemical performance of various cathode mixtures.

A commercially available barium sulfate coated with a conductive tin oxide produced by Mitsui Mining Co. (Japan) was used as an additive. The additive was present in 10 wt % relative to EMD. Two samples of the additive were tested; one sample had a resistivity of 7 Ohm/cm, the other sample had a resistivity of 70 Ohm/cm. The resistivity of an additive in powder form was measured by a 4-probe test method applied to the additive sample while it was held under a 800 kg/cm$^2$ pressure. FIG. 2 is a graph depicting voltammograms recorded for EMD with or without an additive. The amount of EMD was the same in all three measurements. Both additives increased the efficiency of EMD discharge over the entire 0.2 to −0.6 V (with respect to Hg/HgO) voltage range. The more conductive additive (7 Ohm/cm) enhanced the efficiency of EMD discharge more than the additive with higher electric resistivity. The most significant influence of the additive on EMD discharge efficiency was in the lower range of the discharge curve (i.e., after −0.4V), where at −0.5V an additional peak was detected.

Figure 3:
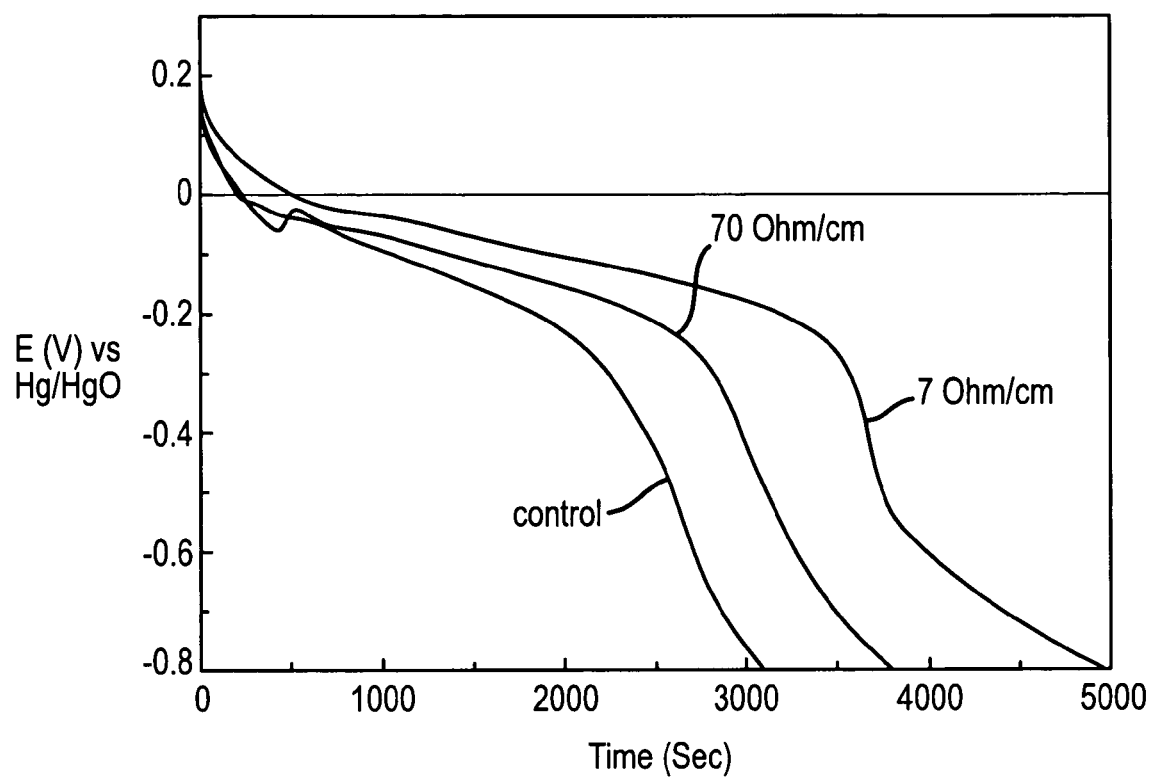
FIG. 3 is a graph depicting electrochemical performance of various cathode mixtures.

Galvanostatic (i.e., constant current) discharge curves of materials prepared as described above are shown in FIG. 3. The amount of active EMD material was the same in all three measurements. Both additives increased the efficiency of EMD discharge. The more conductive additive provided a greater increase in efficiency than the additive with higher electric resistivity. Additionally, the additives increased the load voltage and the apparent EMD capacity. The more conductive additive provided an additional improvement in the low voltage discharge range.

AA size batteries were prepared with a cathode mix of 85.65% EMD, 5.30% graphite, 2.65% conductive additive, and 6.4% of 7 N potassium hydroxide. For this experiment the more conductive (7 Ohm/cm) additive was only used at the 3 wt % level (i.e. 97 wt % EMD, 3 wt % additive). The cathode mix was homogenized in a blender. The cathode mix was pressed into cylindrical ring pellets under 15,000 psi pressure on a laboratory Carver press. The anode contained 71.5% metal zinc powder in a gelling agent. A control cathode was prepared with 88.3% EMD (no additive), 5.30% graphite and 6.4% of 7 N potassium hydroxide. The control cathode contained a larger quantity of active EMD material than the cathode including additive.

Two different intermittent discharge tests were performed for electrochemical evaluation. Cells were discharged for 1 hour at either 250 mA or 3.9 Ohm, followed by 11 hours relaxation, and the charge-discharge cycle repeated until the voltage dropped below 0.75 V. An Arbin electrochemical tester, model BT2043 with an Arbin Mits'97 Smart Edition electrochemical software or a Maccor electrochemical tester, model 4000, with Maccor electrochemical software, version 2.50 were used. was used. All tests were conducted at 74° F.

Figure 4:
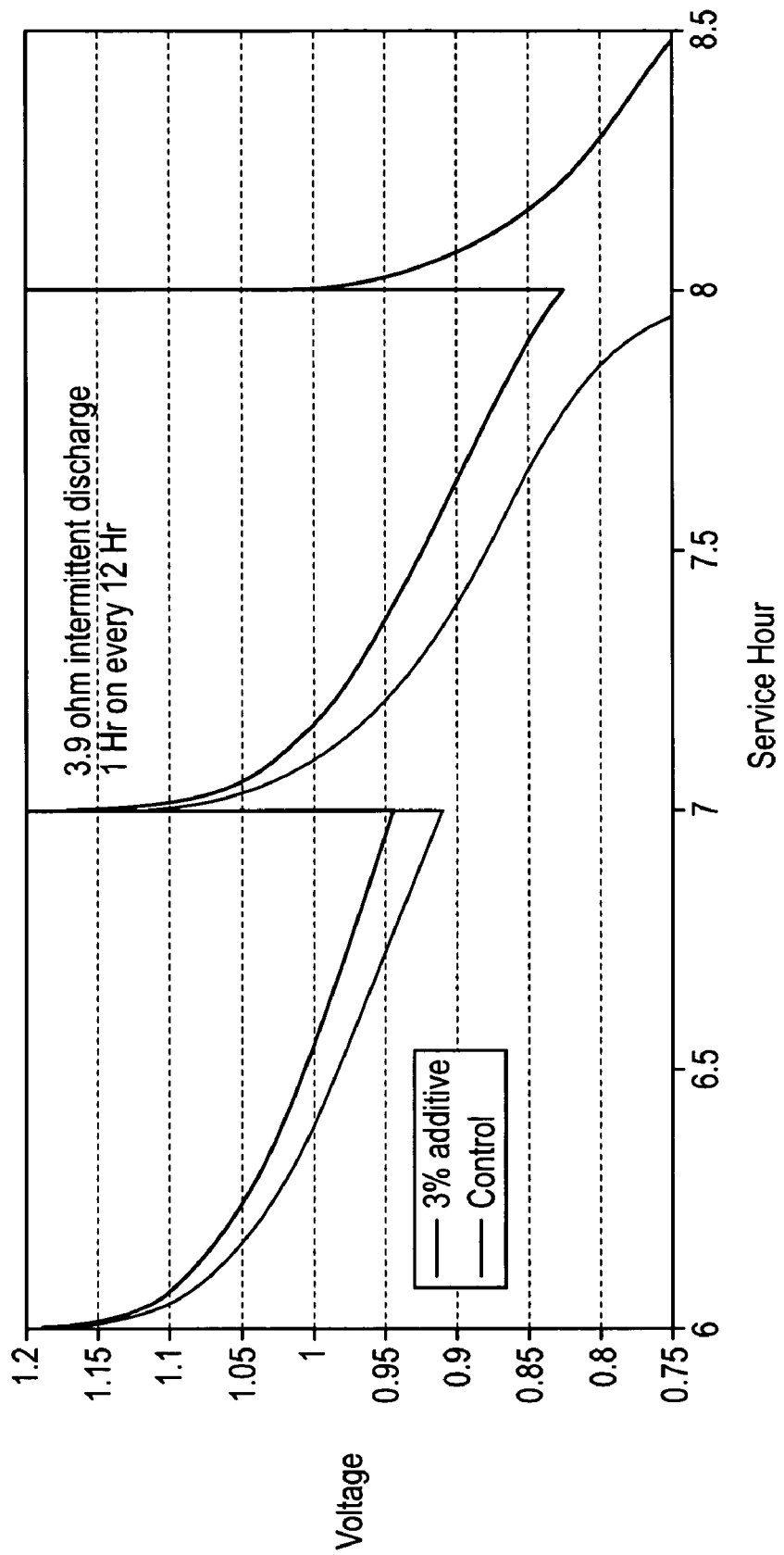
FIG. 4 is a graph depicting battery performance.

FIG. 4 shows the end of a typical intermittent discharge test (3.9 Ohm) of a AA cell, with or without 3% additive in the cathode. During the first 6 hours of the intermittent discharge test, the two cells performed almost identically. After 6 hours, the additive enhanced the EMD discharge efficiency, resulting in a 3.6% increase in service hours. Accounting for the lower amount of EMD in the cathode including conductive additive, this reflected a 6.1% increase in EMD discharge efficiency.

FIG. 5 shows the end of a typical intermittent discharge test (250 mA) of a AA cell, with and without 3% conductive additive in the cathode. At the beginning of the intermittent discharge (up to 7 hours), cells with or without additive performed almost identically. After 7 hours of discharge, the additive enhanced the EMD discharge efficiency and as a result, there was a 2.2% increase in service hours. This reflected to a 4.8% increase in EMD discharge efficiency when the lower content of active material was accounted for.

A number of embodiments have been described. Nevertheless, it will be understood that various modifications may be made. Accordingly, other embodiments are within the scope of the following claims.

What is claimed is:

1. An alkaline battery comprising:
   a cathode comprising an additive, the additive including a barium salt and a coating on a surface of the barium salt, and a manganese dioxide;
   an anode comprising zinc;
   a separator between the cathode and the anode; and
   an alkaline electrolyte in contact with the cathode and the anode.

2. The battery of claim 1, wherein the coating is electrically conductive.

3. The battery of claim 2, wherein the coating includes a metal oxide.

4. The battery of claim 3, wherein the metal oxide is a tin oxide.

5. The battery of claim 1, wherein the barium salt includes barium sulfate, barium hydroxide, barium carbonate, or barium oxide.

6. The battery of claim 1, wherein the manganese dioxide is an electrolytic manganese dioxide.

7. The battery of claim 1, wherein the service life of the battery in an intermittent discharge test is at least 2% longer than the service life of a battery lacking the additive.

8. The battery of claim 1, wherein the service life of the battery in an intermittent discharge test is at least 3% longer than the service life of a battery lacking the additive.

* * * * *